US012690574B1

(12) United States Patent
Hayes

(10) Patent No.: US 12,690,574 B1
(45) Date of Patent: Jul. 28, 2026

(54) FISHING LINE STRAIGHTENER

(71) Applicant: Michael Hayes, Aurora, CO (US)

(72) Inventor: Michael Hayes, Aurora, CO (US)

( * ) Notice: Subject to any disclaimer, the term of this patent is extended or adjusted under 35 U.S.C. 154(b) by 0 days.

(21) Appl. No.: 18/376,294

(22) Filed: Oct. 3, 2023

(51) Int. Cl.
  *A01K 87/00* (2006.01)
  *A01K 87/04* (2006.01)
  *A01K 97/00* (2006.01)

(52) U.S. Cl.
  CPC ............ *A01K 87/008* (2022.02); *A01K 87/04* (2013.01); *A01K 97/00* (2013.01)

(58) Field of Classification Search
  CPC .... A01K 87/008; A01K 87/009; A01K 97/00; A01K 97/06; A01K 99/00
  USPC ............... 43/25, 4, 54.1, 57.1, 57.2; 24/303; 242/147 M, 147 R, 410
  See application file for complete search history.

(56) References Cited

U.S. PATENT DOCUMENTS

| | | | | |
|---|---|---|---|---|
| 664,889 | A | * | 1/1901 | Ogimura ................ A01K 87/00 43/25 |
| 1,251,221 | A | * | 12/1917 | Greenwald ............ A01K 87/00 43/25 |
| 1,602,333 | A | * | 10/1926 | Burke ................... G02C 13/006 15/214 |
| 1,709,436 | A | * | 4/1929 | Koester .................. A01K 97/16 43/25 |
| 1,809,728 | A | * | 6/1931 | Sather .................... A01K 97/16 43/25 |
| 1,920,478 | A | * | 8/1933 | Norton ................... A01K 97/06 43/25.2 |
| 2,183,445 | A | * | 12/1939 | Conterman ............ A01K 87/00 43/25 |
| 2,193,386 | A | * | 3/1940 | Bashore ................. A01K 91/06 43/25 |
| 2,233,311 | A | * | 2/1941 | Harne .................... A01K 97/16 43/25 |
| 2,281,204 | A | * | 4/1942 | Raymond ................. D03J 5/24 242/147 M |
| 2,301,243 | A | * | 11/1942 | Binkley ................. A01K 87/00 43/25 |
| 2,319,292 | A | * | 5/1943 | Boggs ..................... A41F 1/002 2/96 |
| 2,448,611 | A | * | 9/1948 | Martin ................... B42D 9/004 116/234 |

(Continued)

FOREIGN PATENT DOCUMENTS

| | | | | | |
|---|---|---|---|---|---|
| ES | 1214299 | U | * | 6/2018 | ............. A01K 87/04 |
| SE | 500279 | C2 | * | 5/1994 | |
| WO | WO-0100017 | A1 | * | 1/2001 | ............. A01K 87/00 |

*Primary Examiner* — Darren W Ark
(74) *Attorney, Agent, or Firm* — Edwin H. Crabtree

(57) ABSTRACT

A fishing line straightener adapted for releaseable attachment to a portion of a fishing pole. The line straightener includes a spring-like, inverted "U" shaped clip. The clip includes a semi-circle top portion adapted for receipt around a portion of the fishing pole. Extending downwardly from the top portion is a pair of clip arms. A magnet is attached to an inside of each clip arm. The fishing line is received between the two magnets when the clip arms are closed and hold the fishing line therebetween. When the fishing line is reeled onto the fishing reel, the magnets hold the fishing line in tension. This feature prevent loops and curls of the line as it is wound on the fishing reel. The clip arms are opened and spread apart when the fishing pole is casting the fishing line.

8 Claims, 1 Drawing Sheet

(56)                     References Cited

U.S. PATENT DOCUMENTS

| | | | | |
|---|---|---|---|---|
| 2,464,880 A * | 3/1949 | McCombs | A01K 87/00 | 43/25 |
| 2,517,089 A * | 8/1950 | Dean | A01K 97/16 | 118/DIG. 22 |
| 2,519,257 A * | 8/1950 | Legner | A01K 97/16 | 43/25 |
| 2,650,448 A * | 9/1953 | Lichtig | A01K 91/06 | 24/130 |
| 2,680,925 A * | 6/1954 | Grunwald | A01K 87/00 | 43/25 |
| 2,700,787 A * | 2/1955 | Trapanese | A01K 97/16 | 15/210.1 |
| 2,713,228 A * | 7/1955 | Grunwald | A01K 91/06 | 43/25 |
| 2,715,291 A * | 8/1955 | Sweigert | A01K 97/00 | 43/25 |
| 2,715,292 A * | 8/1955 | Williams | A01K 97/06 | 43/25.2 |
| 2,791,858 A * | 5/1957 | Kernodle | A01K 91/02 | 43/25 |
| 2,804,711 A * | 9/1957 | Kozar | A01K 91/02 | 43/25 |
| 2,825,992 A * | 3/1958 | Miller | A01K 97/06 | 43/25.2 |
| 2,846,705 A * | 8/1958 | Marz | A01K 97/00 | 15/210.1 |
| 2,878,610 A * | 3/1959 | Herstedt | A01K 87/00 | D22/199 |
| 3,045,380 A * | 7/1962 | Meredith | A01K 89/01 | 43/25 |
| 3,097,406 A * | 7/1963 | Yarborough | A45C 13/185 | 24/3.12 |
| 3,164,334 A * | 1/1965 | Gris | A01K 97/06 | 43/25 |
| 3,190,027 A * | 6/1965 | Spangler | A01K 97/06 | 43/25.2 |
| 3,199,243 A * | 8/1965 | Caston | A01K 97/08 | 206/315.11 |
| 3,256,633 A * | 6/1966 | Smith | A01K 87/00 | 43/25 |
| 3,529,328 A * | 9/1970 | Davison | A47G 25/485 | 24/303 |
| 3,545,119 A * | 12/1970 | Murnan | A01K 87/04 | 43/25 |
| 3,581,424 A * | 6/1971 | Bloom | A01K 97/00 | 43/25 |
| 3,581,428 A * | 6/1971 | Helder | A01K 87/00 | 43/25 |
| 3,629,905 A * | 12/1971 | Cote | B65D 33/1675 | 24/30.5 R |
| 3,654,722 A * | 4/1972 | Camilleri | A01K 91/02 | 43/25 |
| 3,769,737 A * | 11/1973 | Miyamae | A01K 87/00 | 43/25 |
| 3,927,488 A * | 12/1975 | Peddy | A01K 91/06 | 43/25 |
| 4,003,153 A * | 1/1977 | Khalil | A01K 87/00 | 43/25 |
| 4,156,983 A * | 6/1979 | Moore | A01K 87/00 | 43/25 |
| 4,203,245 A * | 5/1980 | Peterson | A01K 97/06 | D22/199 |
| 4,258,493 A * | 3/1981 | Kettlestrings | G09F 1/10 | 24/339 |
| 4,418,490 A * | 12/1983 | Ancona | A01K 97/06 | 43/57.1 |
| 4,441,274 A * | 4/1984 | Masur | A01K 97/06 | 43/25.2 |
| 4,457,095 A * | 7/1984 | Stevenson | A01K 97/00 | 24/16 PB |
| 4,656,772 A * | 4/1987 | Lopez | A01K 97/00 | 43/25 |
| 4,730,409 A * | 3/1988 | Mitchell | A01K 97/00 | 30/296.1 |
| 4,796,372 A * | 1/1989 | Klein | A01K 97/00 | 43/4 |
| 4,944,111 A * | 7/1990 | Daniel | A01K 97/06 | 43/57.1 |
| 5,020,264 A * | 6/1991 | Demski | A01K 97/06 | 43/57.1 |
| 5,131,180 A * | 7/1992 | Ives | A01K 97/06 | 43/25.2 |
| 5,214,874 A * | 6/1993 | Faulkner | A01K 97/00 | 24/442 |
| 5,218,776 A * | 6/1993 | Wolf, Jr. | A01K 89/003 | 43/25 |
| 5,263,276 A * | 11/1993 | Washington | A01K 87/00 | 43/57.1 |
| 5,277,306 A * | 1/1994 | Sargent | A01K 97/08 | 206/315.11 |
| 5,339,554 A * | 8/1994 | Lippens | A01K 85/00 | 43/4 |
| 5,417,005 A * | 5/1995 | Hale | A01K 97/04 | 24/560 |
| 5,430,968 A * | 7/1995 | Watkins | A01K 87/00 | 43/25 |
| 5,505,014 A * | 4/1996 | Paullin | A01K 97/06 | 220/4.23 |
| 5,511,337 A * | 4/1996 | Nilsson | A01K 91/06 | 43/25 |
| 5,548,918 A * | 8/1996 | Varrichione | A01K 87/00 | 43/25 |
| 5,588,245 A * | 12/1996 | Vance | A01K 97/06 | 43/57.1 |
| 5,682,653 A * | 11/1997 | Berglof | G09F 1/10 | 224/183 |
| 5,870,849 A * | 2/1999 | Colson, Jr. | A01K 97/06 | 24/442 |
| 5,956,881 A * | 9/1999 | Dehm | A01K 97/00 | 43/4 |
| 6,408,563 B1 * | 6/2002 | Van Scoy | A01K 87/00 | 43/25.2 |
| 6,418,658 B1 * | 7/2002 | Knickrehm | A01K 87/00 | 43/25 |
| 6,574,906 B1 * | 6/2003 | Meier | A01K 97/06 | 43/25.2 |
| 6,601,335 B1 * | 8/2003 | Brumfield | A01K 89/00 | 43/25.2 |
| 6,802,151 B1 * | 10/2004 | Jochum | A01K 91/06 | 43/25 |
| 9,510,655 B2 * | 12/2016 | Stratton | A45C 13/1069 | |
| 9,532,556 B2 * | 1/2017 | Farrington | A01K 99/00 | |
| 9,926,953 B2 * | 3/2018 | Russell-Clarke | A44B 13/0029 | |
| 10,039,949 B2 * | 8/2018 | Brasch | A63B 21/0728 | |
| 10,609,912 B2 * | 4/2020 | Snopkowski | A01K 91/04 | |
| 11,248,635 B2 * | 2/2022 | Boettcher | F16B 1/00 | |
| 11,457,617 B1 * | 10/2022 | Boswell | A01K 87/04 | |
| 11,805,767 B2 * | 11/2023 | Bassett | A01K 87/04 | |
| 12,075,580 B2 * | 8/2024 | Mayfield | H05K 5/0091 | |
| 2002/0194769 A1 * | 12/2002 | Wicker | A01K 97/06 | 43/25.2 |
| 2005/0283953 A1 * | 12/2005 | Jeffrey | A47K 10/14 | 24/303 |
| 2008/0104742 A1 * | 5/2008 | Alperin | A41F 17/02 | 24/303 |
| 2011/0252609 A1 * | 10/2011 | Rothbaum | H04M 1/15 | 24/305 |
| 2013/0061514 A1 * | 3/2013 | Smith | A01K 97/10 | 43/54.1 |
| 2015/0366301 A1 * | 12/2015 | Bonno | F16B 2/22 | 24/303 |
| 2015/0380141 A1 * | 12/2015 | Mayfield | A45C 11/00 | 361/679.01 |
| 2016/0003269 A1 * | 1/2016 | Russell-Clarke | A44B 17/0005 | 24/303 |
| 2017/0071182 A1 * | 3/2017 | Larson | A01K 97/16 | |
| 2017/0360021 A1 * | 12/2017 | Raisanen | A01K 97/14 | |
| 2018/0213760 A1 * | 8/2018 | Thrasher | A01K 85/01 | |

(56)                    References Cited

U.S. PATENT DOCUMENTS

| 2019/0098782 | A1* | 3/2019 | Mayfield | ............. | H05K 5/0091 |
|---|---|---|---|---|---|
| 2019/0357510 | A1* | 11/2019 | Martin | ................ | A01K 87/008 |
| 2021/0112794 | A1* | 4/2021 | Elliott | ................... | A01K 97/00 |
| 2023/0062755 | A1* | 3/2023 | Riley | .................... | A01K 97/06 |
| 2023/0232808 | A1* | 7/2023 | Shaver | .................. | A01K 97/06 |
|  |  |  |  |  | 43/54.1 |

* cited by examiner

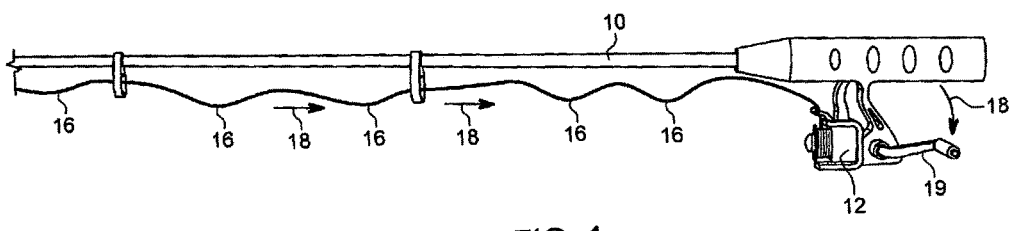
FIG. 1
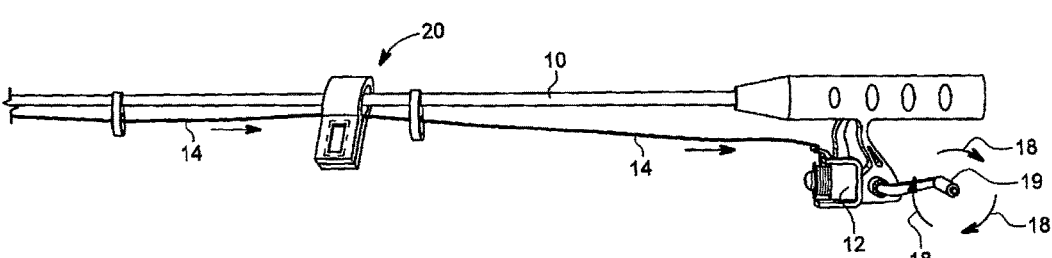
FIG. 2
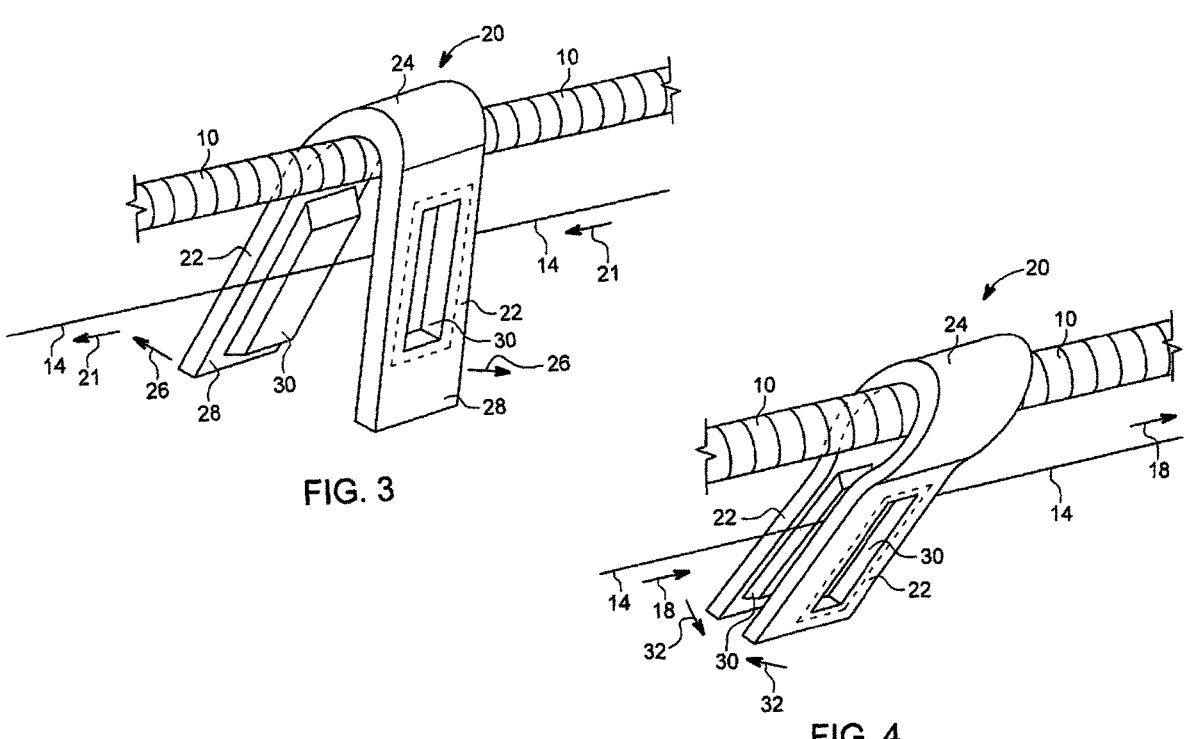
FIG. 3
FIG. 4

FISHING LINE STRAIGHTENER

BACKGROUND OF THE INVENTION

(a) Field of the Invention

This invention relates to an attachment to a fishing pole and a fishing line, and more particularly, but not by way of limitation, to a fishing line straightener for releaseable attachment to a portion of the fishing pole and holding the fishing line in continuous tension when a fishing line is reeled on a fishing reel.

(b) Discussion of Prior Art

Heretofore when fishing and after casting a fishing lure, the fishing line isn't held in continuous tension when reeling in the fishing line. The line includes loops and curls as it enters the reel, thereby causing the line to tangle on the reel. Therefore and at this time, a fisherman uses one of his or her hands to hold the line in tension before it is wounded on the reel. The subject invention provides a means for holding the fishing line in contentious tension when reeling in the fishing line, thus eliminating having to use a hand to hold the line in tension.

SUMMARY OF THE INVENTION

In view of the foregoing, it is a primary objective of the subject invention to releasably attach a fishing line straightener on a fishing pole and hold the fishing line in continuous tension.

Another object of the invention is to avoid tangling of the fishing line as it is wound on a fishing reel.

Still object of the invention is a fisherman, using the subject invention, does not have to hold the fishing line in tension with either hand, when reeling in the line.

The subject invention includes a fishing line straightener adapted for releaseable attachment to a portion of a fishing pole. The line straightener includes a spring-like, inverted U shaped clip. The clip includes a semi-circle top portion adapted for receipt around the fishing pole. Extending downwardly from the top portion is a pair of clip arms. A magnet is attached to an inside of each clip arm. The fishing line is received between the two magnets when the clip arms are closed and when the fishing line is reeled onto the fishing reel. The clip arms are opened and spread apart when the fishing pole is used for casting the fishing line.

These and other objects of the present invention will become apparent to those familiar with fishing poles and fishing line when reviewing the following detailed description, showing novel construction, combination, and elements as herein described, and more particularly defined by the claims, it being understood that changes in the embodiments of invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject fishing line straightener, and in which:

FIG. 1 is a side view of a fishing pole with a fishing reel and a fishing line. The fishing line is shown with loops and curls as it is wound on the reel.

FIG. 2 is a side view of the fishing pole with fishing reel and fishing line with the subject fishing line straightener attached to a portion of the fishing pole.

FIG. 3 is an enlarged view of the line straightener held in an open position when the fishing pole is used for casting a fishing lore.

FIG. 4 is an enlarged view of the line straighter held in a close position and when the fishing reel is used for reeling in the fishing line. The fishing line is held in tension between the two magnets. The magnets face each other and are held together by magnetic attraction, as the fishing line is wound on the fishing reel.

DETAILED DESCRIPTION OF THE PREFERRED EMBODIMENTS

In FIG. 1, a side view of a fishing pole 10 is shown with a fishing reel 12 and a fishing line 14. The fishing line 14 is shown with loops and curls 16 along a length of the fishing pole 10, as it is wound, as indicated by arrows 18, on the reel 12 and using a reel handle 19.

In FIG. 2, a side view of the fishing pole 10 is shown with fishing reel 12, fishing line 14, and with the subject fishing line straightener attached to a portion of the fishing pole. The line straightener is shown with a general reference numeral 20.

In FIG. 3, an enlarged view of the line straightener 20 is shown and held in an open position on the fishing pole, when casting a fishing lure, as indicated by arrows 21. The line straightener 20 includes a spring-like, inverted U-shaped clip 22. The clip 22 can be made of a sheet metal, a plastic, or like material and rigid enough to hold an open position as shown in this drawing and indicated by arrows 26. The clip 22 includes a semi-circle top portion 24 adapted for receipt around the fishing pole. Extending downwardly from the top portion 24 is a pair of clip arms 28. A magnet 30 is attached to an inside of each clip arm 28. The two magnets 30 face each other on the clip arms 28. The fishing line is received between the two magnets 30 when the clip arms 28 are closed, as shown in FIG. 4, and when the fishing line 14 is reeled onto the fishing reel 12. As mentioned above, the clip arms 28 are opened and spread apart when the fishing pole 10 is used for casting the fishing line 14.

In FIG. 4, an enlarged view of the line straighter 20 is shown and held in a closed position, as indicated by arrows 32, using the magnetic attraction of the two magnets 30. The fishing line 14 is held in tension between the two magnets 30 and when the fishing reel 12 is used for reeling the fishing line 14, in tension, on the fishing reel 12, as shown in FIG. 2.

While the invention has been particularly shown, described and illustrated in detail with reference to the preferred embodiments and modifications thereof, it should be understood by those skilled in the art that equivalent changes in form and detail may be made without departing from the true spirit and scope of the invention as claimed except as precluded by the prior art.

The embodiments of the invention for which as exclusive privilege and property right is claimed are defined as follows:

1. A fishing line straightener in combination with a fishing pole with a fishing reel and fishing line, the straightener comprising:

a spring-like, inverted U-shaped clip, the clip having a semi-circular top portion received around a portion of the fishing pole, the clip including a pair of downwardly extending, angular shaped, clip arms; and a pair of angular shaped magnets attached to the pair of clip arms and having lengths extending along lengths of the clip arms, the pair of angular shaped magnets attached to the pair of clip arms such that opposing side portions of each clip arm of the pair of clip arms extend laterally outward and away from opposing sides of each angular shaped magnet of the pair of angular shaped magnets, the fishing line received between the magnets, the magnets holding the fishing line in tension when the fishing line is reeled onto the fishing reel.

2. The line straightener as described in claim 1 wherein the clip is made of plastic.

3. The line straightener as described in claim 1 wherein the clip is made of metal.

4. The line straightener as described in claim 1 wherein the pair of angular shaped magnets are attached to insides of the angular shaped clip arms and face each other, the magnets engaging each other by magnetic attraction when the clip is in a closed position.

5. A fishing line straightener in combination with a fishing pole with a fishing reel and fishing line, the straightener comprising:

a spring-like, inverted U-shaped clip, the clip having a semi-circular top portion received around a portion of the fishing pole, the clip including a pair of downwardly extending, rectangular shaped, clip arms; and a pair of rectangular shaped magnets attached to the pair of clip arms and having lengths extending along lengths of the rectangular clip arms, the pair of rectangular shaped magnets attached to the pair of clip arms such that opposing side portions of each clip arm of the pair of clip arms extend laterally outward and away from opposing sides of each rectangular shaped magnet of the pair of rectangular shaped magnets, the fishing line received between the magnets, the magnets holding the fishing line in tension when the fishing line is reeled onto the fishing reel.

6. The line straightener as described in claim 5 wherein the clip is made of plastic.

7. The line straightener as described in claim 5 wherein the clip is made of metal.

8. The line straightener as described in claim 1 wherein the pair of rectangular shaped magnets are attached to insides of the rectangular shaped clip arms and face each other, the magnets engaging each other by magnetic attraction when the clip is in a closed position.

\* \* \* \* \*